(12) United States Patent
Fenton et al.

(10) Patent No.: US 9,810,927 B1
(45) Date of Patent: Nov. 7, 2017

(54) PROCESS AND SYSTEM FOR CUSTOMIZING EYEGLASS FRAMES

(71) Applicant: 3-D Frame Solutions LLC, Texarkana, TX (US)

(72) Inventors: Elvin W. Fenton, Texarkana, TX (US); Chuck Jordan, Texarkana, TX (US); Jeremy Lehning, Texarkana, TX (US)

(73) Assignee: 3-D Frame Solutions LLC, Texarkana, TX (US)

(*) Notice: Subject to any disclaimer, the term of this patent is extended or adjusted under 35 U.S.C. 154(b) by 91 days.

(21) Appl. No.: 14/662,783

(22) Filed: Mar. 19, 2015

Related U.S. Application Data

(60) Provisional application No. 61/955,542, filed on Mar. 19, 2014.

(51) Int. Cl.
| | |
|---|---|
| A61B 3/00 | (2006.01) |
| G02C 13/00 | (2006.01) |
| G02C 11/02 | (2006.01) |
| B33Y 10/00 | (2015.01) |
| B33Y 50/00 | (2015.01) |
| B33Y 80/00 | (2015.01) |

(52) U.S. Cl.
CPC ............ *G02C 13/005* (2013.01); *G02C 11/02* (2013.01); *B33Y 10/00* (2014.12); *B33Y 50/00* (2014.12); *B33Y 80/00* (2014.12); *G02C 2200/14* (2013.01)

(58) Field of Classification Search
USPC ................................................ 351/204, 246
See application file for complete search history.

(56) References Cited

U.S. PATENT DOCUMENTS

| | | |
|---|---|---|
| 5,983,201 A | 11/1999 | Fay |
| 6,533,418 B1 | 3/2003 | Izumitani et al. |
| 6,682,195 B2 | 1/2004 | Dreher |
| 6,692,127 B2 | 2/2004 | Abitbol et al. |
| 6,944,327 B1 | 9/2005 | Soatto |
| 7,959,287 B1 | 6/2011 | Saffra |
| 7,996,997 B2 | 8/2011 | Warntjes et al. |
| 8,005,651 B2 | 8/2011 | Summit et al. |
| 8,220,923 B2 | 7/2012 | Saffra |
| 8,243,334 B2 | 8/2012 | Abeloe |
| 8,412,588 B1 | 4/2013 | Bodell et al. |
| 8,488,197 B2 | 7/2013 | Abeloe |
| 8,538,570 B2 | 9/2013 | Stanhope et al. |
| 8,556,420 B2 | 10/2013 | Sayag |
| 8,718,982 B2 | 5/2014 | Fisker et al. |
| 2006/0100832 A1 | 5/2006 | Bowman |
| 2010/0316972 A1 | 12/2010 | Klare et al. |
| 2013/0132898 A1 | 5/2013 | Cuento |
| 2013/0310965 A1 | 11/2013 | Schouwenburg |
| 2014/0067107 A1 | 3/2014 | Stanhope et al. |
| 2014/0268007 A1 | 9/2014 | Ben-Shahar |

*Primary Examiner* — Jack Dinh
(74) *Attorney, Agent, or Firm* — Dunlap Codding, P.C.

(57) ABSTRACT

A process for creating a production specification for a customized eyeglass frame for a patient includes the following steps. A library is accessed having fully parameterized standardized models for characterizing a plurality of eyeglass frame styles. The models are configured to accept a plurality of customization inputs including patient biometric data. A customized model of an eyeglass frame is then constructed by populating the fully parameterized standardized model corresponding to the eyeglass frame style selected by the patient with the customization inputs for the patient. An output is generated from the customized model, the output corresponding to the production specification for the customized eyeglass frame.

15 Claims, 5 Drawing Sheets

PROCESS AND SYSTEM FOR CUSTOMIZING EYEGLASS FRAMES

CROSS REFERENCE TO RELATED APPLICATIONS INCORPORATION BY REFERENCE STATEMENT

This application claims priority to U.S. Provisional Application No. 61/995,542 filed on Mar. 19, 2014, which is hereby expressly incorporated herein by reference in its entirety.

BACKGROUND OF THE INVENTIVE CONCEPTS

1. Field of the Inventive Concepts

The presently claimed and disclosed inventive concepts relate generally to methods and systems for making customized eyewear and, more particularly, but not by way of limitation, to methods, systems and software for making a customized production specification and eyeglass frames utilizing a generative fabrication process.

2. Brief Description of Related Art

Vision corrective eyewear lenses are positioned by the frame in front of the eyes of the patient and can be effective only when held in a specific prescribed position in relation to the eyes. The positioning is accomplished by utilizing an eyeglass frame that provides repeatable positioning along with stability so that the eye has a consistent view to the corrective lens. In addition, the frame should be comfortable and aesthetically pleasing to the patient.

In the past, the fit, stability and comfort of eyeglass frames has been accomplished by frame selection from a group of available frames at the point-of-sale. Thus, one problem for the patient is that he or she is required to pick frames from a limited inventory of frames that the retail eye doctor may carry. This not only limits the selection, but forces the patient to pick a frame that fits best based on what is available in stock.

Furthermore, the frames that are stocked by vision professionals are not optimized for each patient's spatial features or head shape and size. A compromise must be made so that positioning, repeatability, stability, comfort, as well as appearance are all deemed to be acceptable to the individual patient, but not necessarily optimized for the individual patient. The compromises and approximations inherent in the selection of eyeglass frames are further compromised by the natural non-symmetrical qualities of the human head while the frames are constructed symmetrically. Some patient's may have injuries, deformities, or other anatomical problems that actually exclude them from standard frame selection.

If a patient does find a frame that fits well, the patient is limited by its production quantities and availability when the time comes to replace the current frames. For example, if the selected frame is later made unusable due to wear, breakage or loss, a duplicate of the frame may not be available due to discontinuation of the frame model by the manufacturer. In such instances, a new selection with a new group of compromises must then be made.

There can also be issues when pieces of a current frame breaks or needs replacement. Getting replacement components can be difficult or impossible and require the purchase of a new frame, possibly one that does not fit as well as the one being replaced. The presently disclosed and claimed inventive concepts address these needs.

SUMMARY OF THE DISCLOSURE

The inventive concepts disclosed and claimed herein relate generally to processes and systems for making customized eyeglass frames utilizing generative fabrication processes. In one embodiment, a process for creating a production specification for a customized eyeglass frame for a patient includes the following steps. A frame library is accessed having fully parameterized standardized models for characterizing one or more eyeglass frame styles. The models are configured to accept a plurality of customization inputs including patient biometric data. A customized model of an eyeglass frame is then constructed by populating the fully parameterized standardized model corresponding to the eyeglass frame style selected by a patient with the customization inputs for the patient. An output is generated from the customized model, the output corresponding to the production specification for the customized eyeglass frame.

In another embodiment, the production specification for the customized eyeglass frame can then be transmitted to a generative fabrication process, such as a 3-D printer, for fabricating the customized eyeglass frame.

Thus, utilizing (1) the technology known in the art; (2) the above-referenced general description of the presently claimed and disclosed inventive concept(s); and (3) the detailed description that follows, the advantages and novelties of the presently claimed and disclosed inventive concept(s) would be readily apparent to one of ordinary skill in the art.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, and drawings. The figures are not necessarily to scale and certain features and certain views of the figures may be shown exaggerated, to scale or in schematic in the interest of clarity and conciseness. In the drawings.

DETAILED DESCRIPTION OF EXEMPLARY EMBODIMENTS

Figure 1:
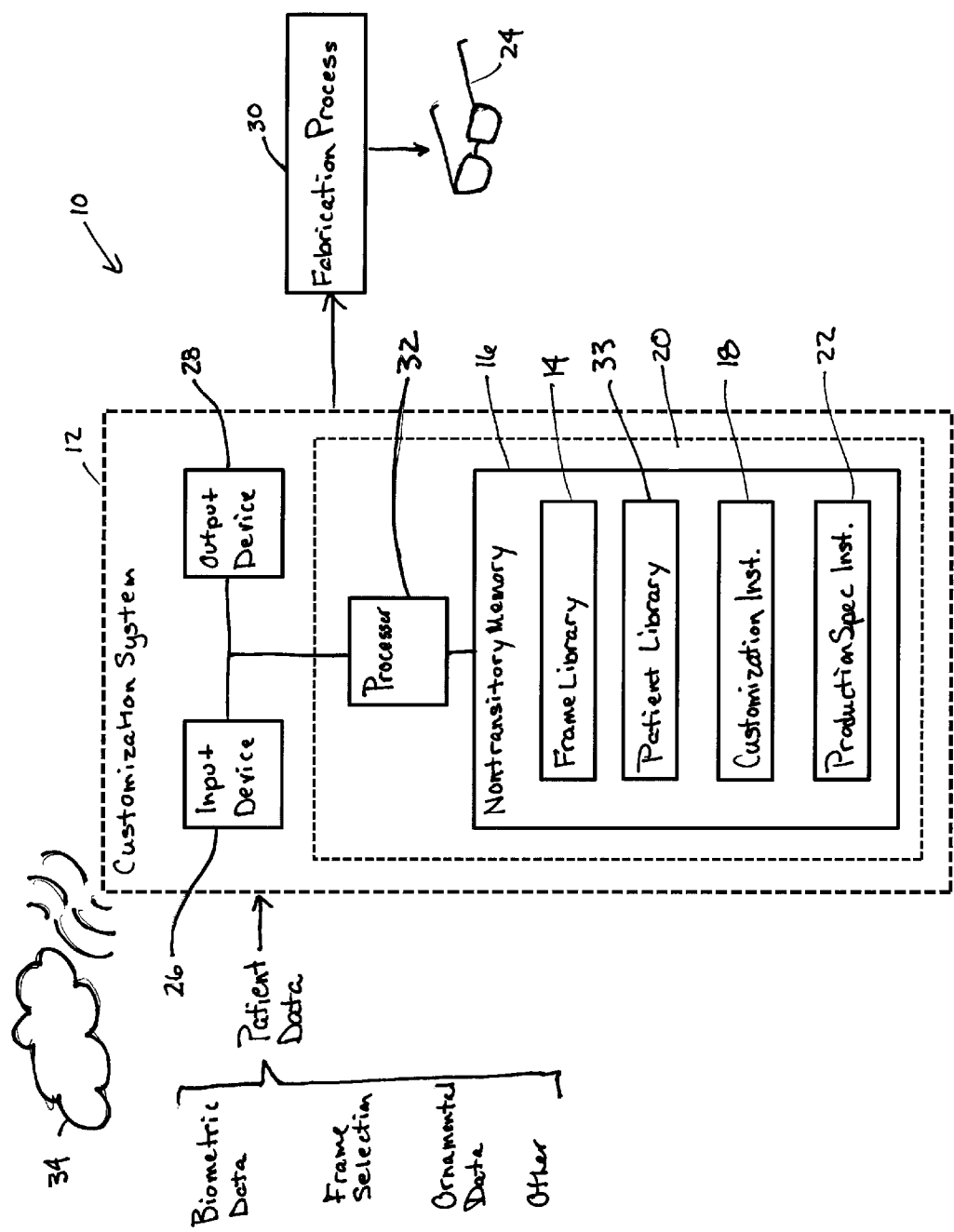
FIG. 1 is a block diagram of a system for creating a customized eyeglass frame according to the present disclosure.

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In the following detailed description of embodiments of the disclosure, numerous specific details are set forth in order to provide a more thorough understanding of the disclosure. However, it will be apparent to one of ordinary skill in the art that the concepts within the disclosure can be practiced without these specific details. In other instances, well-known features have not been described in detail to avoid unnecessarily complicating the description.

Corrective eyewear that closely conforms to the needs of a patient must allow for the individual nonconformities of the patient. While a family or families of eyeglass frames can approximate the needs of many users, none of these families can accommodate the nonsymmetrical and other dimensional variances found in people. The presently claimed and disclosed inventive concepts allow the physical dimensions of the patient to be measured or known and utilized in manufacturing eyeglass frames for that individual. Additionally, data describing each individual dimensional description can be stored and used for duplication of the eyeglass frame parts and replacement of the frame. Using a data base of frame descriptions with dimensions that may be altered by the prescriber can allow for a custom fit of eyewear for each individual and individual dimensions can be retained or stored for future use.

In general, methods and systems are provided for fabricating a customized eyeglass frame. Referring now to FIG. 1, shown therein is an exemplary embodiment of a customized eyeglass frame production system 10 constructed in accordance with the inventive concepts disclosed and claimed herein. The customized eyeglass frame production system 10 for fabricating a customized eyeglass frame includes a customization system 12 with a frame library 14 of parameterized models for characterizing one or more eyeglass frame styles. The parameterized models are configured to accept a plurality of customization inputs including a patient's biometric data. The customization system 12 further includes a non-transitory computer-readable storage medium 16 storing a set of customization instructions 18 capable of being executed by one or more computing devices 20, that when executed by the one or more computing devices causes the one or more computing devices to construct a customized model of an eyeglass frame by populating the parameterized standardized model corresponding to the eyeglass frame style selected by a patient with the customization inputs for the patient. The non-transitory computer-readable storage medium 16 further stores a set of production specification instructions 22 capable of being executed by the one or more computing devices 20, that when executed by the one or more computing devices causes the one or more computing devices to generate an output corresponding to a production specification for the customized eyeglass frame 24. Having a digital library of patient frames and information specific to their dimensions and a library of frames that can be printed at any time allows customers the maximum flexibility and choice of replacement frames and parts.

The customization system 12 can utilize the computing device 20, an input device 26 for receiving patient data, and output device(s) 28 to display available frame styles and to output the production specification to a fabrication process 30. The computing device 20 is provided with computer hardware including a processor 32 in communication with the non-transitory computer readable medium 16. The non-transitory computer readable medium 16 stores logic, such as software that includes instructions that when executed by the processor 32 cause the processor 32 to record patient data in a patient library 33, customize eyeglass frames using the patient data in the patient library 33, and generate a production specification for the customized eyeglass frame. Exemplary non-transitory computer readable medium 16 may include random access memory, read only memory, flash memory, and combinations thereof. The term "non-transitory computer readable medium," as used herein, includes implementation as a single physical device or multiple physical devices of a distributed system that may or may not be logically related.

The computing device 20 can be implemented as a personal computer, a smart phone, a network-capable TV set, TV set-top box, a tablet, an e-book reader, a laptop computer, a desktop computer, a network-capable handheld device, a video game console, a server, and combinations thereof, for example. The computer hardware may be a system or systems that are able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors.

The term "processor" as used herein may include a single processor or multiple processors working independently and/or together to execute the logic described herein.

The input device 26 for the computing device 20 is capable of receiving information input from a patient or other user, and transmitting such information to the computer hardware. The input device can be implemented as a keyboard, a touchscreen, a mouse, a trackball, a microphone, a fingerprint reader, an infrared port, a slide out keyboard, a flip out keyboard, a cell phone, a PDA, a video game controller, a remote control, a fax machine, and combinations thereof, for example.

The one or more output device 28 for the computing device 20 can output information in a form perceivable by a patient or other user. For example, the output device can be a computer monitor, a screen, a touchscreen, a speaker, a website, a TV set, a smart phone, a PDA, a cell phone, a fax machine, a printer, a laptop computer, and combinations thereof. It is to be understood that the input device and the output device may be implemented as a single device, such as for example a touchscreen of a smart phone or tablet.

The computing device 20 can also transmit the production specification information to the fabrication process 30 in a wired or wireless manner. For example, the computing device 20 may include a transceiver for transmitting/receiving information signals to/from a base station or web server 34 via, for example, a cellular antenna. Thus, electronics of the computing device 20 can be used to store patient information, and/or transmit the information to the fabrication process 30 or a base station or a specific communication address via wireless and/or wired, and/or optical communication technology well understood by those skilled in the art.

The eyeglass frame library 14, sometimes referred to herein as the "frame library," can be kept on, for example, one or more memories or storage mediums 16 in the computing device 20 located on-site, remotely, or in "the cloud." Utilizing, for example, the input and output devices 26 and 28, respectively, a patient can select a desired eyeglass frame style from the eyeglass frame library 14 on-site, or can input the information to the computing device 20 from a remote location. In one embodiment, families of fully parameterized standardized symmetrical frames are stored in the frame library 14. The frame library 14 can also include patient-selected options such as colors, and additional "extras" or "ornamentals" such as designs, words, name(s), and the like to personalize the eyeglass frame. Dimensions, measurements, colors, ornamentals, and other parameters of the stored frame families can be altered to match the patient data, also referred to as customization inputs, before the frames are built or manufactured, which can enhance positioning, repeatability, stability, and comfort.

Figure 2:
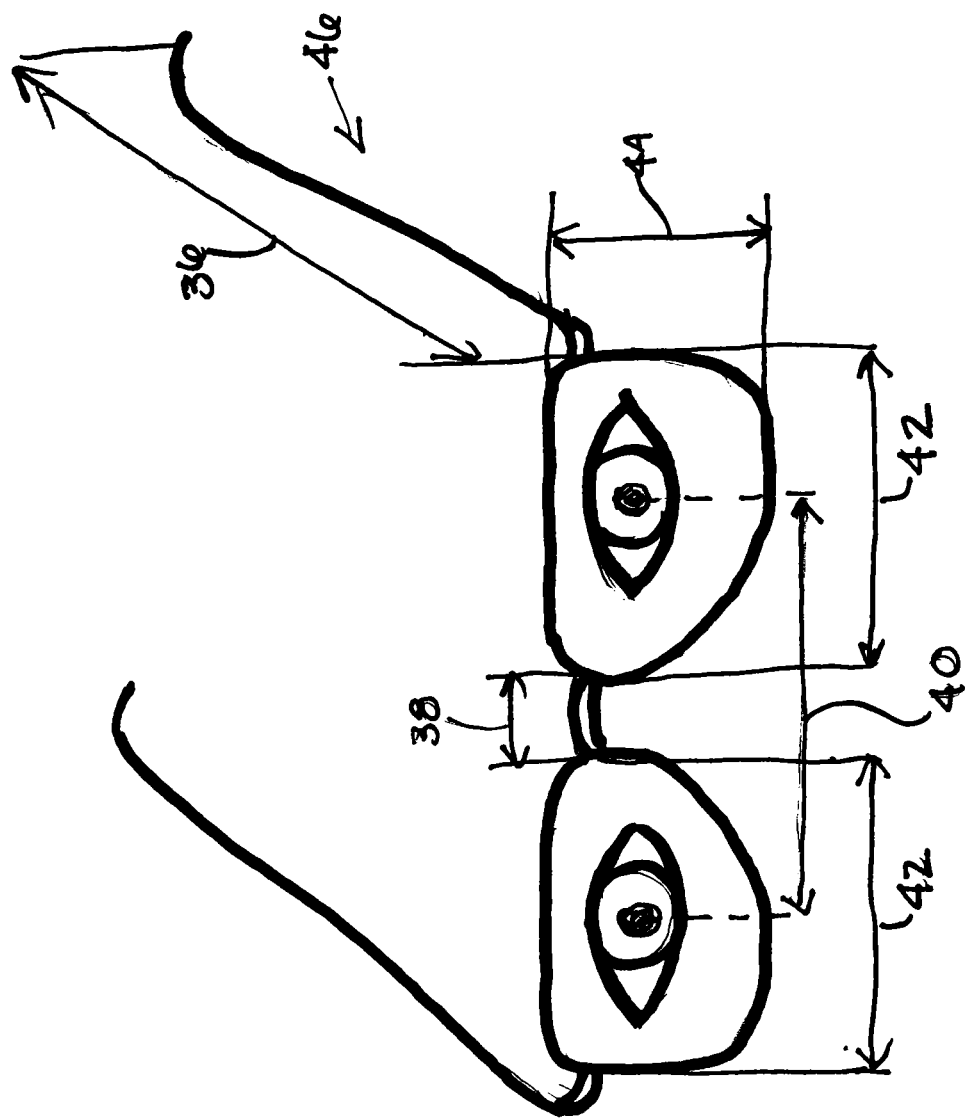
FIG. 2 shows patient biometric data as components of an eyeglass frame.

Referring to FIG. 2, In one embodiment, a systematic group of measurements referred to as biometric data is obtained for a patient's eyes, head, and ears to produce a three-dimensional description of each individual patient which can be preserved and utilized to produce an eyeglass frame that avoids the compromises and approximations that are inherent with selecting from existing symmetrical frames.

Biometric data can include temple length 36, bridge width 38, eye size, interpupillary distance 40, lens width 42, lens height 44, and wrap which applies to certain frame styles and is the distance between the frame front and the beginning of the temple. These values can be measured manually or determined from one or more photographs of the patient.

In one embodiment, an adjustable frame 46 is manipulated to fit the patient's head and face, and then used to provide the biometric data related to the frame measurement. The biometric data can be read directly from the adjustable frame 46, or the adjustable frame can be adapted to transmit the measurements to the computing device 20 in a wired or wireless manner. For example, fitting the adjustable frame to a patient's head can provide the temple length 36 as the distance from a side of the head to the eye wire. The eye size consists of three measurements: the eye size A or lens width 42, measured as the distance across the center of one lens; a vertical measurement B or lens height 44 measured as the distance from the top to the bottom of the lens; the effective diameter or diagonal measurement of the lens, ED (not shown and specific to the frame style); and the bridge width 38 which is the distance between the two eye lenses. Differences in the left and right ear height and temple length can be accommodated. The amount of curve needed to fit comfortably around each of the patient's ears can also be determined. Some or all of these measurements can then be applied to a specific frame style stored in the frame library 14.

In another embodiment, a camera can be used to take one or more digital images of the patient's head and a measuring and scaling program is used to estimate the biometric measurements. Optionally, the patient can view his or her face on a monitor or output device 28 showing the selected frame styles.

In one embodiment, pantoscopic tilt is estimated from initial measurements, and then calculated and optimized from the biometric measurements taken of the patient and the retrieved parameterized standard model for characterizing the eyeglass frame selected by the patient.

Additional creative customization input for each patient can include ornamental data such as color, etched or embossed lettering and designs, patterns, cavities for insertion of bling, and the like.

In another embodiment, the customization instructions 18 and the resulting customized eyeglass frame 24 can include spaces designed and adaptable for embedding electrical components such as hearing aid components. Cavities in the bridge or in one or both temple sections, for example, can be included to hold inserted components, application parts, or even patches of medication. For example, the embedded design of electronic devices can be modeled such that the design and manufacture of a patient's frame can include housing devices such as hearing aids, microprocessors, and the like.

In one embodiment, a transdermal pharmaceutical delivery system is embedded in the temple of the customized eyeglass frame 24. By providing a customized fitted temple, a transdermal application of medication can be administered discreetly from a reservoir allocated in the temple. For example, a small thin replaceable pouch that could house pharmaceuticals can be inserted in a temple cavity of the frame wherein the pharmaceutical can be administered through a semi permeable membrane much like a nicotine patch or a birth control patch (Orthoevra). Pharmaceutical agents such as a disposable trans-dermal patch can be placed in frame areas that come into contact with the skin, such as the inside distal end of the temple. This replaces the need for unsightly patches for medications for birth control, pain, motion sickness, nicotine, and many others. This also allows patients to wear their pharmaceutical delivery device inconspicuously while treating their ailment. It can allow for larger quantities of medicine to be stored compared to traditional patches and can provide a safer system, i.e. a hard surface covering the reservoir of pharmaceuticals versus a thin plastic pouch stuck on the skin that can easily be compromised.

A description of a patient's biometric data and other customization requirements can be stored electronically so that additional frames can be produced that fit the patient and patient requirements and wherein the eyeglass frames can be obtained in different styles. The patient's file can be editable, stored and retrieved locally, off-site, or over the "cloud" for manufacturing by the fabrication process 30, such as for example, a 3-D printer.

Optionally, the eyeglass frame dimensions and/or the production specification can be transmitted or communicated to a distant fabrication process 30 for production of the customized eyeglass frame 24. Alternatively, the eyeglass frame dimensions and/or the production specification can be transmitted or communicated to a local or onsite fabrication process 30 for on-site production of the customized eyeglass frame 24. The patient can optionally view the actual manufacture of his or her selected and customized frame in real time by either observing first hand if manufactured on site, or by observing a video or real-time video if manufactured remotely.

The production specification can include a flattening process for manufacture using a generative fabrication process. Examples of suitable generative fabrication processes include, but are not limited to, stereolithography, fused layer modeling, layer laminate manufacturing, 3-D printing, and laser sintering. In one embodiment, the generative fabrication process utilized is 3-D printing.

Figure 3:
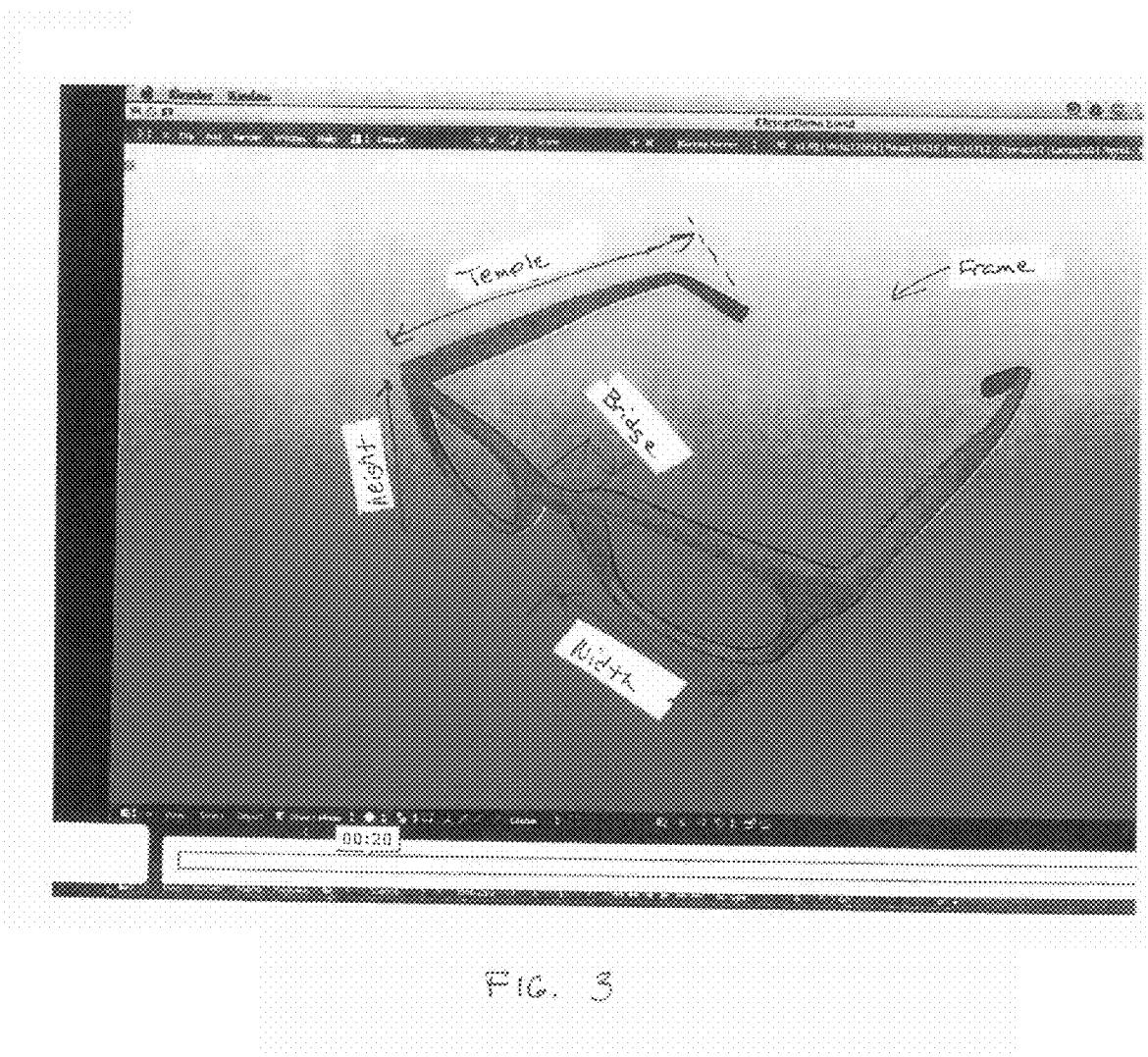
FIG. 3 is a computer image of an eyeglass frame having adjustable or customizable biometric data.

In one embodiment, a three-dimensional (3-D) parameterized standardized model in the frame library 14 and as shown in FIG. 3 is manipulated in STL file format, also known as stereolithography or standard tessellation language. The standardized model of the eyeglass frame may be originally designed and stored in another language such as a CAD program. Conventionally, the CAD program would be used to manipulate the frame design to incorporate the patient data including the patient biometric data. The resulting production specification would then be saved as an STL file for fabrication using a 3-D printer. However, in the presently described and claimed methods and systems, the standardized 3-D model is populated with the patient customization inputs and manipulated in an STL format. The STL file describes the surface geometry of a three-dimensional standardized model using a mesh of triangles. To manipulate the frame dimensions, these triangles are stretched or shrunk. The size of the triangles determines how smoothly and accurately curved surfaces are printed. This is in part why conventional procedures do not attempt to manipulate 3-D models by stretching in STL format. However, the presently described methods and systems overcome this disadvantage by ensuring a maximum triangle size during manipulation of the frame design. This can be accomplished, for example, by instructing that once a triangle reaches a certain size the triangle divides. This can also be accomplished using voxels rather than triangles. Control can also be accomplished by imposing a maximum allowable angular deviation between adjacent triangles and increasing tessellation once this angular deviation is reached. These methods allow control of the number and size of the triangles or voxels to provide a smooth surface in the customized model and therefore a smooth surface in the customized eyeglass frame fabricated using a generative fabrication process such as 3-D printing.

Figure 4:
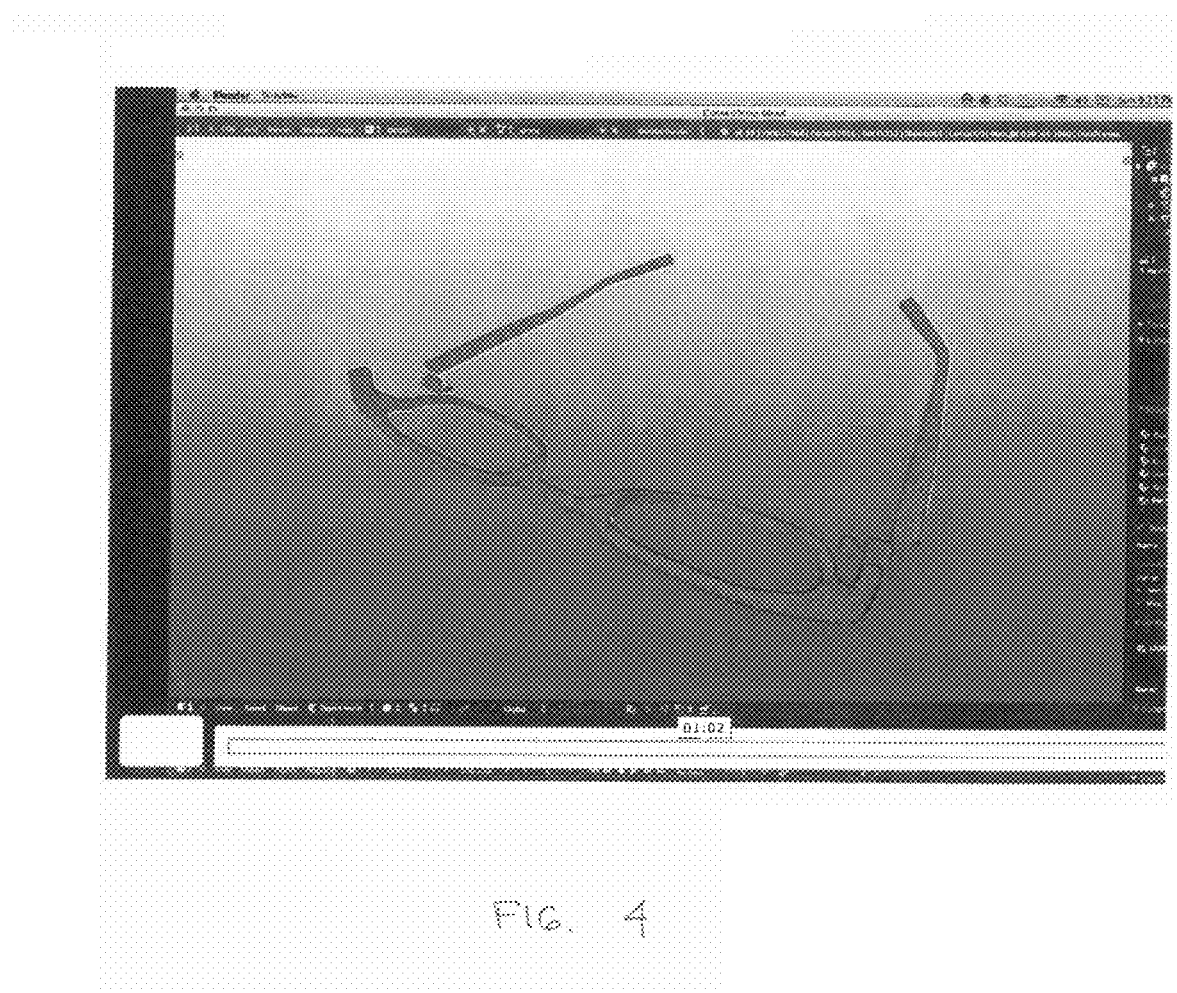
FIG. 4 shows an example flattening process for a customized eyeglass frame.
Figure 5:
FIG. 5 shows an example "flattened" production specification for the customized eyeglass frame.

The production specifications also separate the customized model into individual parts and arrange the individual parts in a flattened configuration as shown in FIG. 4 and FIG. 5. This helps to make the fabrication process faster and use less material.

In one embodiment, a 3-D printer is used for fabrication of the customized eyeglass frame 24. Many different 3-D printers are presently available and it is anticipated that many more will be in the future. Materials that can be utilized in 3-D printers include plastic, metal, ceramics, castable wax, plated precious metal, among others.

The customized eyeglass frame 24 can be finished using traditional sanding or using a chemical finish. A roll and tumble process with wood chips can be substituted for hand sanding. Paint with plastic primer can be applied to fill striations and sanded for a marble-like appearance. The finishing can also include a hydrodipping process to apply printed designs.

In the following example, specific customization procedures and fabrication processes are described. However, the present inventive concepts are not be limited in their application to the specific procedures. Rather, the Example is simply provided as one of various embodiments and is meant to be exemplary, not exhaustive.

EXAMPLE

After an optometry examination, a client chose a frame style and color and her facial measurements were taken using an adjustable frame. The adjustable frame was manipulated to fit the client's head and face, and then measured or read directly from the frame to provide the necessary biometric data. Using a computer camera, as real time image of the client's face was displayed on a computer monitor while superimposing an image of the eyeglass frame.

An STL file was manipulated on a design computer to fit the client's biometric measurements by identifying points along the design surface that should be stretched while maintaining the curvature. The customized STL file was modified to a flattened production specification which was sent to a 3-D printer in wired communication with the design computer. The 3-D printer used a red ABS plastic and first built a "raft" upon which the manufactured customized frame was supported. The customized frame was printed along with an upper raft. Both rafts were peeled off and disposed of post-print.

The customized frame was sanded and hydrodipped to apply a contrasting color design. Prescription lenses were ground, polished, and snap-fitted into the customized frame.

From the above descriptions, it is clear that the presently disclosed and claimed inventive concept(s) are well-adapted to carry out the objects and to attain the advantages mentioned herein, as well as those inherent in the presently disclosed and claimed inventive concept(s). While the presented embodiments have been described for purposes of this disclosure, it will be understood that numerous changes may be made which will readily suggest themselves to those skilled in the art and which are From the above descriptions, it is clear that the presently disclosed and claimed inventive concept(s) are well-adapted to carry out the objects and to attain the advantages mentioned herein, as well as those inherent in the presently disclosed and claimed inventive concept(s). While the presented embodiments have been described for purposes of this disclosure, it will be understood that numerous changes may be made which will readily suggest themselves to those skilled in the art and which are accomplished within the spirit of the presently disclosed and claimed inventive concept(s).

What is claimed is:

1. A process for creating a production specification for a customized eyeglass frame for a patient, the process comprising the steps of:

accessing a frame library of parameterized standardized models for characterizing a plurality of eyeglass frame styles, the models configured to accept a plurality of customization inputs, the customization inputs comprising patient biometric data;

constructing, for a patient, a customized model of an eyeglass frame by populating the parameterized standardized model corresponding to the eyeglass frame style selected by the patient with the customization inputs for the patient; and generating an output from the customized model corresponding to the production specification for the customized eyeglass frame and transmitting the output to a generative fabrication process for fabricating the customized eyeglass frame.

2. The process of claim 1, wherein the customization input further comprises ornamental data selected from the group consisting of color, etching or embossing of letters and/or designs, and cavities for insertion of bling.

3. The process of claim 1, wherein the patient biometric data includes bridge width, lens width, lens height, and temple length.

4. The process of claim 1, wherein the step of generating an output includes separating the customized model into individual parts and arranging the individual parts in a flattened configuration to form the production specification for the customized eyeglass frame.

5. The process of claim 1, further comprising the step of generating the customized eyeglass frame using the generative fabrication process.

6. The process of claim 5, wherein the generative fabrication process is selected from the group consisting of stereolithography, fused layer modeling, layer laminate manufacturing, 3-D printing, and laser sintering.

7. The process of claim 5, wherein the generative fabrication process comprises 3-D printing.

8. The process of claim 7, further comprising storing the customization inputs for a patient such that part of the customized eyeglass frame can be duplicated.

9. The process of claim 7, wherein the patient biometric data is obtained at the same location as the 3-D printing process.

10. The process of claim 7, wherein the biometric data of the patient is received from a location remote from the 3-D printing process.

11. The process of claim 10, further comprising creating and transmitting to the patient a real-time video showing the step of generating the customized eyeglass frame.

12. A process for making a customized eyeglass frame, the method comprising:

measure a patient's biometric data, the biometric data comprising bridge width, lens width, lens height, and temple length, and saving the biometric data in a patient library;

retrieving from a frame library, a parameterized standardized model for characterizing an eyeglass frame selected by the patient;

combining the patient biometric measurements with the parameterized standardized model for the eyeglass frame selected by the patient to construct a customized model of the eyeglass frame; and generating a production specification from the customized model of the eyeglass frame and outputting the production specification to a 3-D printer.

13. The process claim 12, further comprising generating the customized eyeglass frame using the 3-D printer.

14. The process of claim 12, further comprising calculating pantoscopic tilt from the biometric data taken of the patient and the retrieved parameterized standardized model for characterizing the eyeglass frame selected by the patient.

15. The process of claim 12, further comprising incorporating one or more patient-selected options into the customized model.

* * * * *